US 6,314,569 B1
Nov. 6, 2001

(54) SYSTEM FOR VIDEO, AUDIO, AND GRAPHIC PRESENTATION IN TANDEM WITH VIDEO/AUDIO PLAY

(75) Inventors: Richard Steven Chernock, Newton, CT (US); Paolo Dettori, Bedford Hills, NY (US); Frank Andre Schaffa, Hartsdale, NY (US); David Israel Seidman, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/200,212

(22) Filed: Nov. 25, 1998

(51) Int. Cl.[7] ............................. H04N 5/445; G06T 1/00
(52) U.S. Cl. ........................ 725/37; 725/142; 345/328
(58) Field of Search .................. 348/9, 10, 473, 348/474, 476–485, 563, 564, 584, 589, 590, 600, 906, 1–13, 586, 588; 455/2–6.3; 725/37, 142, 112; 345/328

(56) References Cited

U.S. PATENT DOCUMENTS

| | | | |
|---|---|---|---|
| 4,616,327 | * | 10/1986 | Rosewarne et al. . |
| 4,786,967 | | 11/1988 | Smith, III et al. . |
| 4,839,743 | | 6/1989 | Best et al. . |
| 4,847,700 | | 7/1989 | Freeman . |
| 5,353,121 | | 10/1994 | Young et al. . |
| 5,446,505 | * | 8/1995 | Chang Soo .......................... 348/738 |
| 5,541,738 | | 7/1996 | Mankovitz . |
| 5,585,858 | | 12/1996 | Harper et al. . |
| 5,592,551 | | 1/1997 | Lett et al. . |
| 5,689,305 | * | 11/1997 | Ng et al. ............................ 348/416 |
| 5,708,764 | | 1/1998 | Borvel et al. . |
| 5,734,720 | * | 3/1998 | Salganicoff .......................... 380/20 |
| 5,737,030 | | 4/1998 | Hong et al. . |
| 5,754,783 | * | 5/1998 | Mendelsen et al. .................. 709/217 |
| 5,774,666 | * | 6/1998 | Portuesi .............................. 709/218 |
| 5,929,849 | * | 7/1999 | Kikinis ................................ 345/327 |
| 5,969,715 | * | 10/1999 | Dougherty et al. .................. 345/327 |
| 6,006,241 | * | 12/1999 | Punaveja et al. .................... 707/512 |
| 6,144,972 | * | 11/2000 | Abe, et al. .......................... 707/501 |
| 6,192,183 | * | 2/2001 | Taniguchi et al. .................... 386/52 |

* cited by examiner

Primary Examiner—Andrew Faile
Assistant Examiner—Reuben M. Brown
(74) Attorney, Agent, or Firm—Scully, Scott, Murphy & Presser; Douglas W. Cameron, Esq.

(57) ABSTRACT

A method for displaying an enhanced multimedia presentation including personalized supplementary audio, video, and graphic content selectable by a user and rendered by a receiving device, comprises the steps of: communicating a multimedia presentation file to the receiving device, the multimedia presentation file comprising base multimedia presentation content and, frame-synchronized information including starting frame timing identifier, ending frame timing identifier, starting frame spatial coordinates, ending frame spatial coordinates, and motion vector specifications for describing frame-accurate location, motion and timing of the personalized supplementary audio, video, and graphic content, the frame-synchronized information indicating one or more free areas of the multimedia presentation absent significant base multimedia content; extracting the frame-synchronized information from the multimedia presentation file; retrieving the personalized supplementary content from the receiving device; decoding the personalized supplementary content at a time sufficiently in advance of the starting frame timing identifier; and the receiving device selecting an indicated free area and initiating display of one or more items of the personalized supplementary content at frame-accurate times between the starting frame timing identifier and ending frame timing identifier at the frame coordinates in accordance with the frame-synchronized information.

28 Claims, 4 Drawing Sheets

SYSTEM FOR VIDEO, AUDIO, AND GRAPHIC PRESENTATION IN TANDEM WITH VIDEO/AUDIO PLAY

BACKGROUND OF THE INVENTION

1. Field of the Invention

The present invention relates to the displaying of graphics objects such as text or sprites overlaying a multimedia television presentation, and more specifically to the display of animated graphics or play out of video or audio coordinated with a multimedia presentation.

2. Description of Prior Art

Many video applications, including interactive and multimedia applications, take advantage of the video viewer's equipment capability to display graphics overlays on the video screen such as a TV or a PC monitor. These graphics displays either dominate the entire screen, as in the case of many electronic program guides or menus, or sections thereof. The video behind these graphic overlays is entirely or partially obscured, thereby interfering with the viewing experience. Systems for the presentation of electronic program guides, such as described in U.S. Pat. Nos. 5,737,030, 5,592,551, 5,541,738, and 5,353,121, display these guides either on a screen devoid of video or one which uses a still frame or moving video simply as a background, with no coordination between the location of items in the video and the location of graphics overlays.

Currently, Viewers' equipment, such as set-top boxes (STB), does not have the capability to determine where objects are located in the video. Determination of object's location in a video is necessary in order to place the graphics objects, such as the on-screen text or animate characters, in locations which do not interfere with objects appearing in the video presentation.

Systems such as the one described in U.S. Pat. No. 5,585,858 attempt to coordinate video and graphic displays by including in the broadcast stream, or pre-storing at the viewers' equipment, graphic overlay screens designed to be compatible with the video content. However, these screens must be created well in advance of the presentation, and thus lack the flexibility to create and display non-interfering graphics overlays adaptively. In addition, those systems display graphics at specific "trigger points" in the presentation, not at arbitrary points throughout the presentation.

Other systems which add graphics or audio content to an existing presentation, such as described in U.S. Pat. No. 5,708,764, require the active participation of the viewer in the process of presentation. The viewer, for example, may be required to answer a number of questions before or during the presentation, the responses are then displayed on the screen at predetermined times.

Systems which allow the personalization of content for individual users are well known in the context of Web browsing. Other systems, such as systems described in U.S. Pat. Nos. 5,585,858 and 4,616,327, provide a limited number of introductions, by the viewers' equipment of predetermined text or graphics. Some systems, such as described in U.S. Pat. Nos. 4,839,743, 4,786,967, and 4,847,700, provide audio and/or video personalization through the selection among a small number of alternate video and audio tracks which are broadcast simultaneously. The selection is performed at the viewer's equipment.

What is needed is a system whereby the location and timing of video objects and audio events are made available to the viewers' display equipment, giving that equipment the flexibility to add non-interfering graphics or audio when and where it sees fit, in an adaptive manner throughout a presentation, rather than at limited points. This ability will allow the viewers' equipment to create a tandem video/audio/graphics presentation without requiring viewers' active participation in the presentation process. That system must allow coordination of graphics content that is not pre-stored, such as broadcast news bulletins, and perform still or animated graphics overlay of video, addition or replacement of video, and audio replacement in coordination with the existing video and audio content of a presentation.

SUMMARY OF THE INVENTION

The present invention is a system for the definition and use of information which enables the display or playing of audio, video or graphics objects in tandem with the video and audio play of a digital video presentation. The presentation thus enhanced may be available via a broadcast or in a video-on-demand scenario. The video distribution system over which the video is made available can be a one-way system, such as a terrestrial television broadcast, or a two-way communication, such as a hybrid fiber/coaxial cable system with return channel capability.

The invention enables the tandem presentation of additional audio, video, or graphics by defining video and audio "holes" in the video or audio presentation at which there is no significant video or audio activity. "Holes" are locations and times in the video presentation. Graphics or audio objects are appropriately presented by the STB in those "holes". The STB is notified as to the location and/or times associated with these "holes", as well as other information which characterizes the material which the STB must present.

With this information, this invention allows the STB to judiciously place graphics objects on screen or play audio or video content, and avoid interference with video objects or audio events. The graphics objects displayed by the STB can be static or dynamic, i.e., animated. Thus, the invention also enables the creation of video presentations in which objects in the original video or animation interact and move in tandem with video or graphics objects which are added by the viewer's equipment. For example, a cartoon may be created in which several characters are seen on screen at once and a "hole" is left for the addition of an animated character which is added by the viewer's equipment such as an STB.

Alternatively, the "hole" could be defined at the location of a relatively less important character which can be obscured by the STB-animated character. The viewers whose STB does not support the present invention will still be able to see a presentation with no video "holes". The information as to what type of character can be added, at what screen locations, at what times, and optionally, the motion of the added character must be delivered to the STB in advance of the display of the character.

Similarly, the invention allows tandem audio play between the audio content of the presentation and audio content which is introduced by the STB.

The invention allows for the personalization of the video, graphics or audio content introduced by the STB. The personalization is achieved by a viewer when he or she specifies several personal parameters, such as name and age through a viewer interface. To continue the above example, a child's name may be entered in the STB's personalization information. When viewing the prepared presentation, the STB-animated character can display this child's name, when this character is presented in the location of video "holes". Alternatively, the STB can play an audio clip of the child's name during audio "holes." Personalized audio or video clips may be recorded and stored in the STB for use in the tandem play.

Thus, the present invention allows a single version of material such as a cartoon presentation to be created and broadcast, yet be viewed and heard differently by various viewers, and tailored to them specifically. A hybrid presentation is in effect created, the sum of the original presentation and the graphics and/or audio which is introduced by the viewers' STB into the "holes."

Accordingly, in the present invention personalization information, audio and video segments and possibly "hole" information are stored in the STB. The STB receives a multimedia presentation stream embedded with "hole" information. The "hole" information is embedded into the stream during an authoring stage, where the creator of the presentation determines the "hole" locations and times. That "hole" information is extracted on the STB, and audio and video segments and personalization information previously stored on the STB, are coordinated with the "holes" and displayed in tandem with the multimedia presentation.

DETAILED DESCRIPTION OF THE INVENTION

Figure 1:
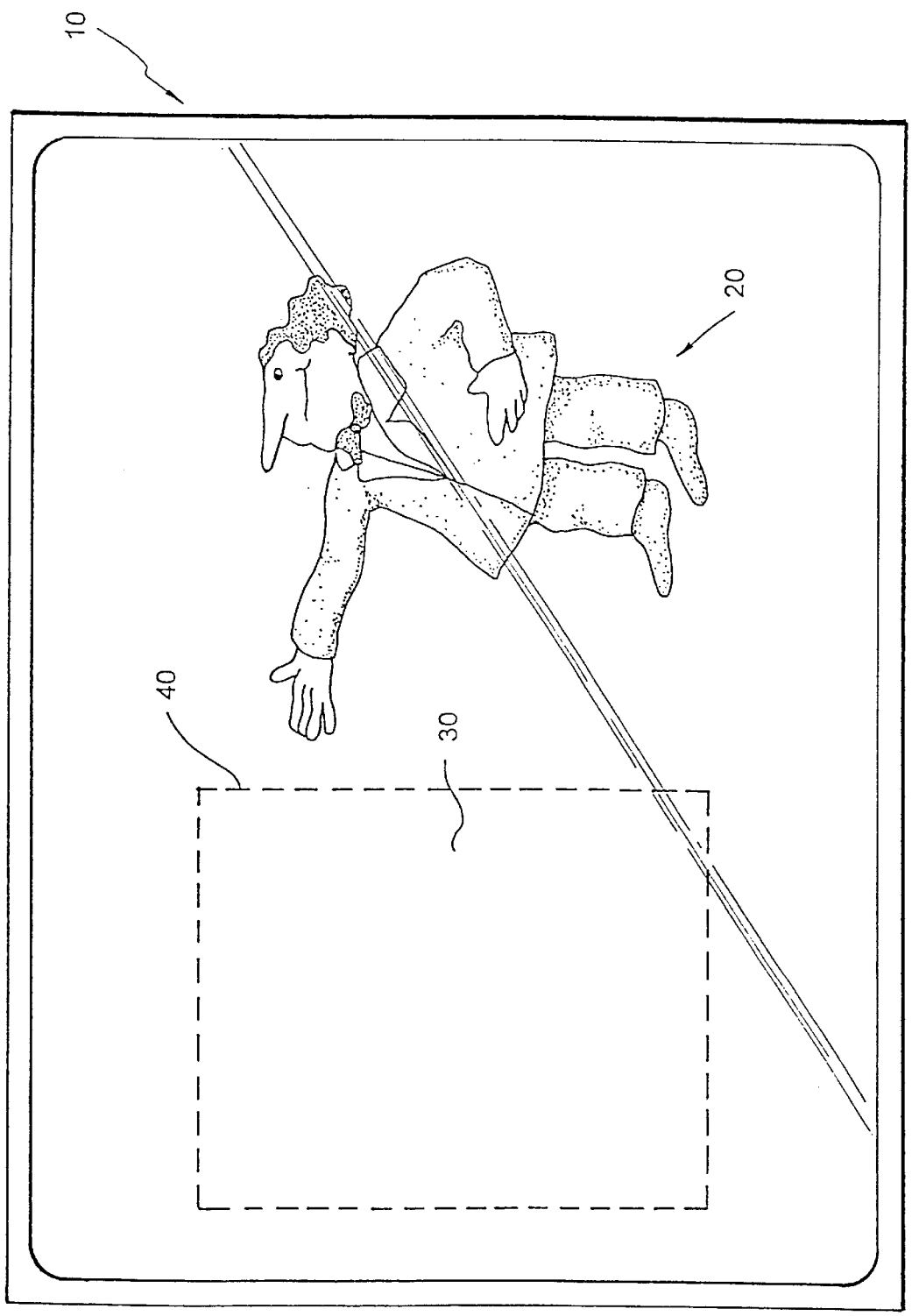
FIG. 1 is a view of a monitor screen displaying an animated presentation with the location of a video "hole" indicated.

The steps necessary to prepare and to play a presentation with tandem STB video graphics display and/or audio or video play according to the invention include:

1. defining video and audio "holes" during an authoring stage and embedding them as part of control information in the presentation stream with video and audio;
2. performing personalization on viewer's STB;
3. delivering the presentation stream to viewer's STB;
4. extracting the control information from the presentation stream and parsing by the STB; and
5. displaying video and audio of the presentation stream together with graphics, audio, or video objects provided by the STB during the time and location of the "holes".

Authoring Stage

In order to specify the location and time of video and audio "holes", a video presentation must be marked with control information. In the preferred embodiment, this is done offline, through the use of an authoring system designed for this marking process and described in U.S. patent application Ser. No. 09/032,491.

The control information may also be added in real time to a live presentation in progress, by specifying video "holes" to the STB. The STB will use this information to display text associated with the program, e.g., news or a sports program, and broadcast along with the video and audio. The choice of text for display can be based on personalization information already stored in the STB.

The authoring system accepts as input video/audio content. An author steps through the content, marking locations of video and/or audio "holes." The markings thus created are used by the authoring system to create control information describing these "holes", which is inserted into the video/audio content.

In the preferred embodiment, the control information takes the form of HTML tags which indicate:

1. "hole" identifier used to coordinate "hole" with insertion application.
2. "hole" type, e.g., video or audio,
3. beginning time of "hole",
4. ending time of "hole",
5. beginning screen location of "hole", e.g., x, y coordinates in video,
6. ending screen location of "hole" e.g., x, y coordinates in video,
7. motion vector for "hole" movement in video,
8. description of bitmap(s) to be insert in video "hole", and
9. volume level for inserted audio.

An automatic object recognition may be incorporated into the authoring system to simplify the authoring process. An author specifies the initial location of a video object, e.g., a less-significant character, and its subsequent locations are detected by the authoring system, which inserts appropriate control information into the stream as the object moves.

For digital video streams, the Motion Pictures Experts Group (MPEG-2) compression for audio and video signals, and MPEG-2 Systems transport for the transport of those signals may be used. Because of the high bit rate requirements of digital video, a compression method is usually applied to a video before transmission over a network. In the preferred embodiment, video and audio content are compressed using MPEG-2 compression, as specified in ISO/IEC 13818-2 for video and ISO/IEC 13818-3 for audio.

The MPEG-2 standard also specifies how presentations consisting of audio and video elementary streams can be multiplexed together in a "transport stream". This is specified in the MPEG-2 Systems Specification, ISO/IEC 13818-1. The MPEG-2 Systems Specification accommodates the inclusion in a presentation's transport stream of non-video and non-audio streams, by use of "private data" streams. All transport stream packets, regardless of content, are of a uniform size (188 bytes) and format. "Program-Specific Information", which is also carried in the transport stream, carries the information regarding which elementary streams have been multiplexed in the transport stream, what type of content they carry, and how they may be demultiplexed. In this embodiment, the control information is carried in an MPEG-2 Transport Stream private data stream.

In the embodiment utilizing MPEG-2 video, beginning and ending times for "hole" specification are specified in terms of the Presentation Time Stamp (PTS) of the frames where the "hole" appears. PTSs are typically present in every frame to every third frame, and this is sufficient for synchronization, since the frame rate for NTSC video is 30 frames/second. Video "holes" are rectangular, and thus specified by a pair of (x, y) coordinates. Other embodiments may use more complex polygons to describe video "hole" shape, and require more coordinates and a specification of which polygon is to be used. The video "hole" movement is linear between the beginning and ending screen location.

Again, more complex functions may be specified in other embodiments to describe video "hole" movement.

Delivery Stage

The control information may be expressly created for the function of the present invention with "holes" left in the video and/or audio for insertion of the content by the STB. In order to show a full presentation to those viewers whose STB does not support the present invention, "holes" may actually be a default unit of video or audio content. Presentations which were not designed for the present invention may be retrofitted to accommodate it, i.e., "holes" may be found in the existing content areas and/or sounds which can be overlaid.

After forming the control information, the video presentation together with such control information may be transported to the viewer's STB by being sent a. in the video blanking interval of an analog video signal and extracted by the viewers' equipment in a manner similar to that used for closed-caption information;

b. in a separate Vestigial Side Band channel;

c. within a digital video/audio stream, and extraction of embedded data is performed by the viewers' equipment in a manner similar to that used for the extraction of video or audio streams.

The STB

Figure 4:
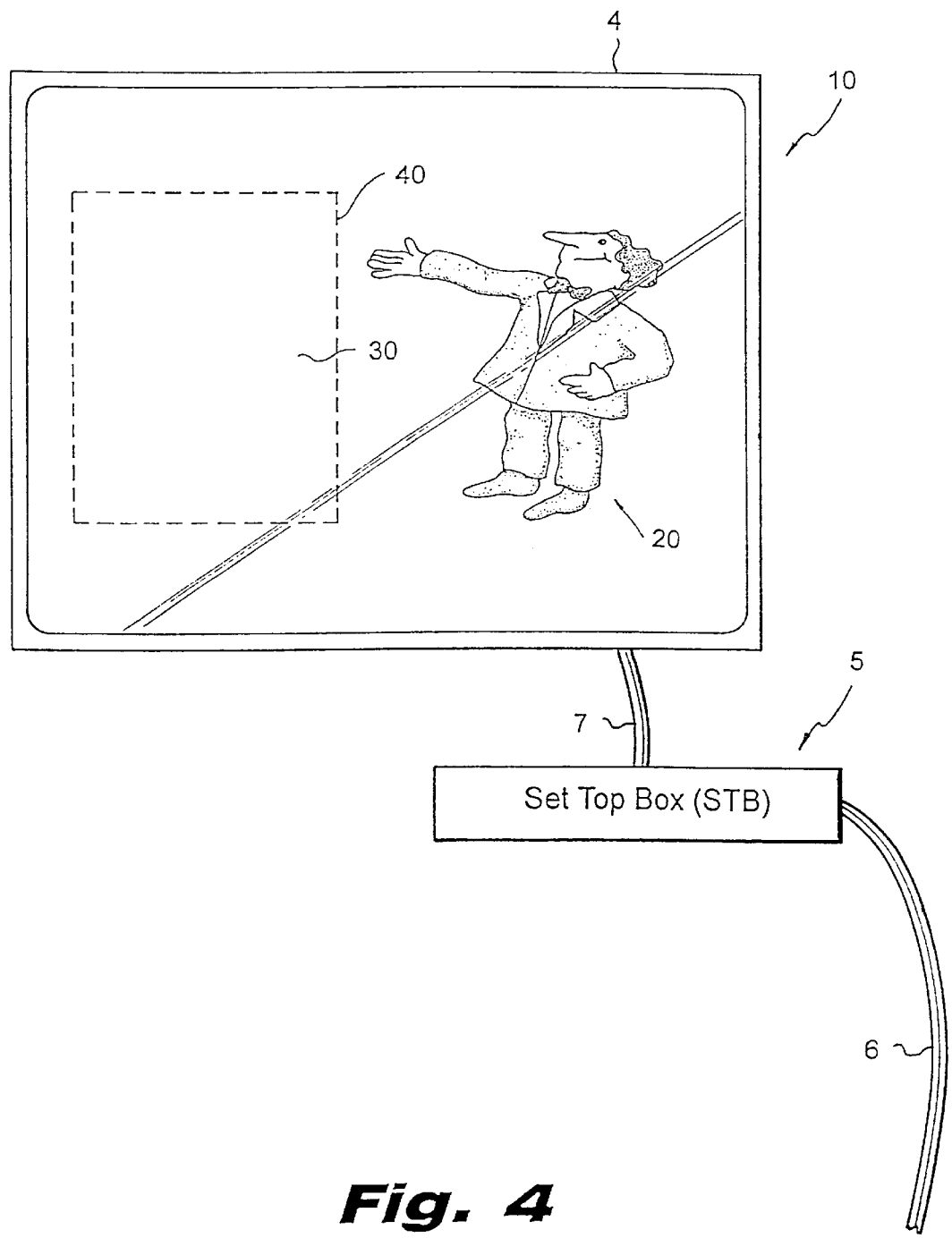
FIG. 4 shows typical equipment necessary for the extraction of "hole" information and display of tandem content.

FIG. 4 shows typical equipment necessary for the present invention. It comprises a television set or a monitor screen 4, cable 6 to receive the multimedia presentation, the STB 5 to accept, process and to forward the resulting presentation over cable 7, to be displayed on the monitor screen 4. MPEG-2 demultiplexers, MPEG-2 audio decoders and MPEG-2 video decoders are now widely available. The C-Cube C19110 Transport Demultiplexer, C-Cube C19100 MPEG-2 Video Decoder, and Crystal Semiconductor CS4920 MPEG Audio Decoder are examples. In the preferred embodiment, the video and audio decoders may be implemented together in a single chip, such as the IBM CD21 MPEG-2 Audio/Video decoder. If not incorporated in the audio and video decoder, an intermediate IC is necessary at the output of the decoders to convert from digital to analog and, in the case of video, encode to the desired video analog signal format such as NTSC, PAL, or SECAM. S-video output from these IC's is optional.

The on-screen graphics objects which overlay video content are rendered using the on-screen display (OSD) functions of the MPEG-2 Video Decoder in the STB. These decoders vary in the sophistication of the OSD which they offer and in the application program interfaces (API) which are used to control the OSD. Individual pixels can be addressed, and bitmaps are used for many text and graphic objects. A minimum level of OSD graphics capability offers 16 colors. A preferred capability offers 256 colors and multi-level blending capability. The blending capability of the OSD allows for varying degrees of opacity for the graphics overlay.

Overlay of audio content is performed by the STB audio decoder in the case of MPEG audio or by the STB processor utilizing an API to a media player. File formats supported by this player include ".wav", ".rmi", and ".mid". Alternatively, the audio playing function can be incorporated into the STB's application itself. Video replacement or addition can be performed by an additional video decoder in the STB. Systems with "picture-in-picture" capability can use this feature for addition or replacement of video objects.

In either case, the audio being played is mixed with or preempts the original audio of the presentation, utilizing the STB's audio output. In another embodiment, one in which two tracks of audio are available, one for music and one for dialogue, the STB can replace the content of the latter tract while allowing the former to continue as usual.

The presentation of the present invention, which is to be viewed, may be broadcast using the NTSC or PAL for analog or ATSC or DVB for digital television standards. In another embodiment, the presentation may be viewed and controlled on a per-users basis, as with a video-on-demand systems or viewing from a video tape.

The processing power needed to implement the present invention can be easily accommodated by the processing capabilities of the processors in most current STB's, which start at roughly 1 MIP. This processor runs the video/audio content insertion application, and controls the use of the OSD and audio functions.

An STB 5 typically has between 1 and 4 MB of RAM. The program of the present invention needs to be downloaded to or stored in the RAM of the STB, it would occupy approximately up to 0.5 MB.

Only a small amount of the STB 5 storage is required to store personalization information for all viewers in a household. In the preferred embodiment, personalization information for each viewer includes:

1. name,
2. age,
3. content restrictions, e.g., PG-13,
4. text preference, e.g., large type,
5. enable audio replacement,
6. enable video replacement, and
7. pointer to sprite associated with viewer.

This information needs to be stored in non-volatile memory in order to persist when the viewers' STB is powered off or during power failures. Typical STB's have non-volatile RAM for this purpose.

Figure 2:
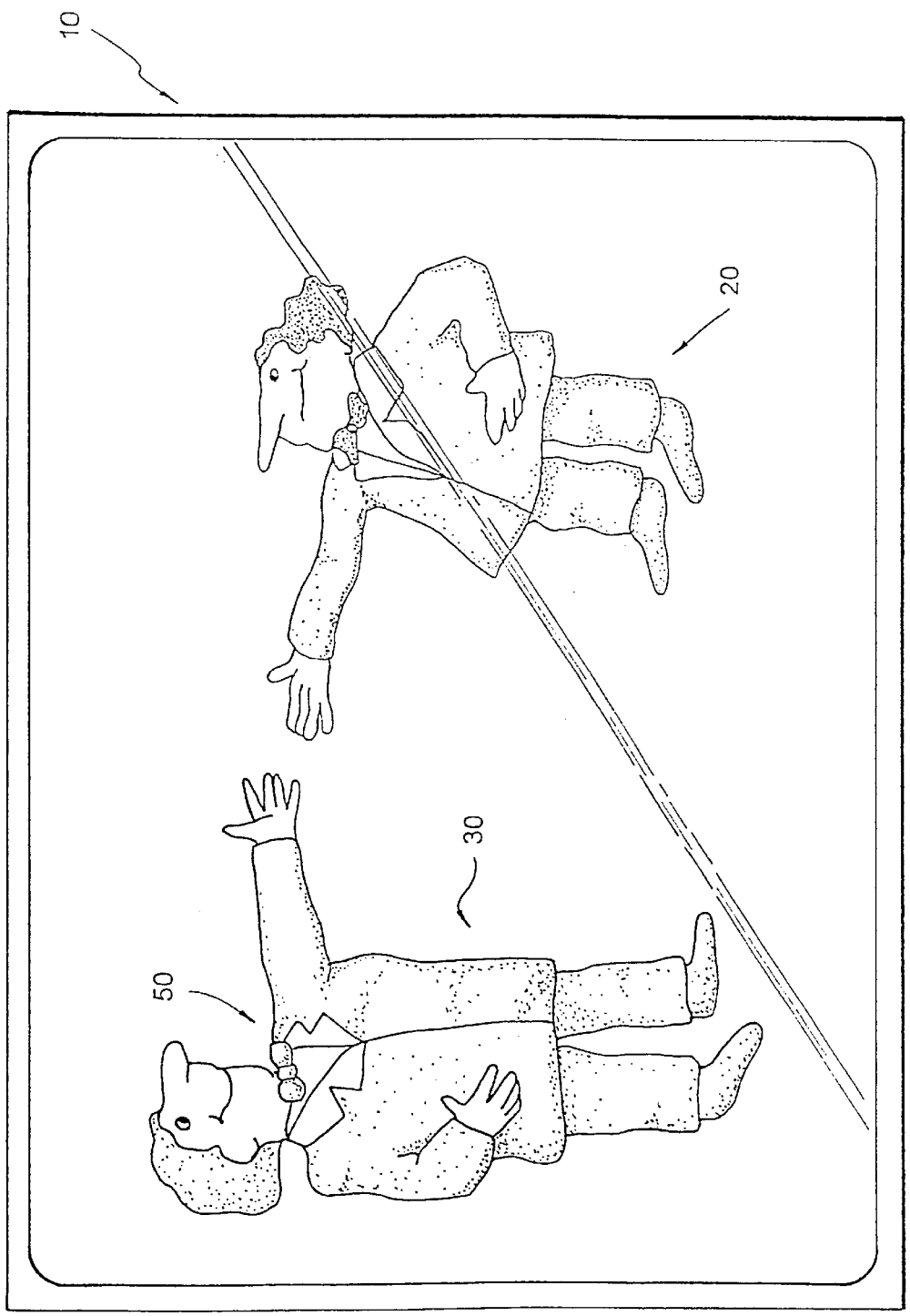
FIG. 2 is the view of the same screen as FIG. 1, with the addition of an STB-animated character in the video "hole" location.

FIGS. 1 and 2 provide example screen displays according to a presentation prepared initially for a tandem play. FIG. 1 shows a screen 10 of an animated program with one video character 20. The location of a "hole" 30 is indicated by dotted lines 40. The dotted lines 40 around the "hole" 30 are only illustrative, and would not appear in the actual program. Control information concerning the location of the "hole" 30 is embedded in the video stream and extracted by the STB.

FIG. 2 shows the same screen with the addition of an STB-animated character 50 which is displayed in the location of a "hole" 30. Alternatively, the STB could have used the "hole" 30 for display of graphics text describing the character, for example.

It is also possible to prepare for a presentation utilizing a mechanism that looks for locations of "holes" 30 which occur naturally in the audio and video presentation. Alternatively, "holes" 30 may be created in a presentation by blanking out sections of the existing audio track or obscuring sections of the video screen.

Figure 3:
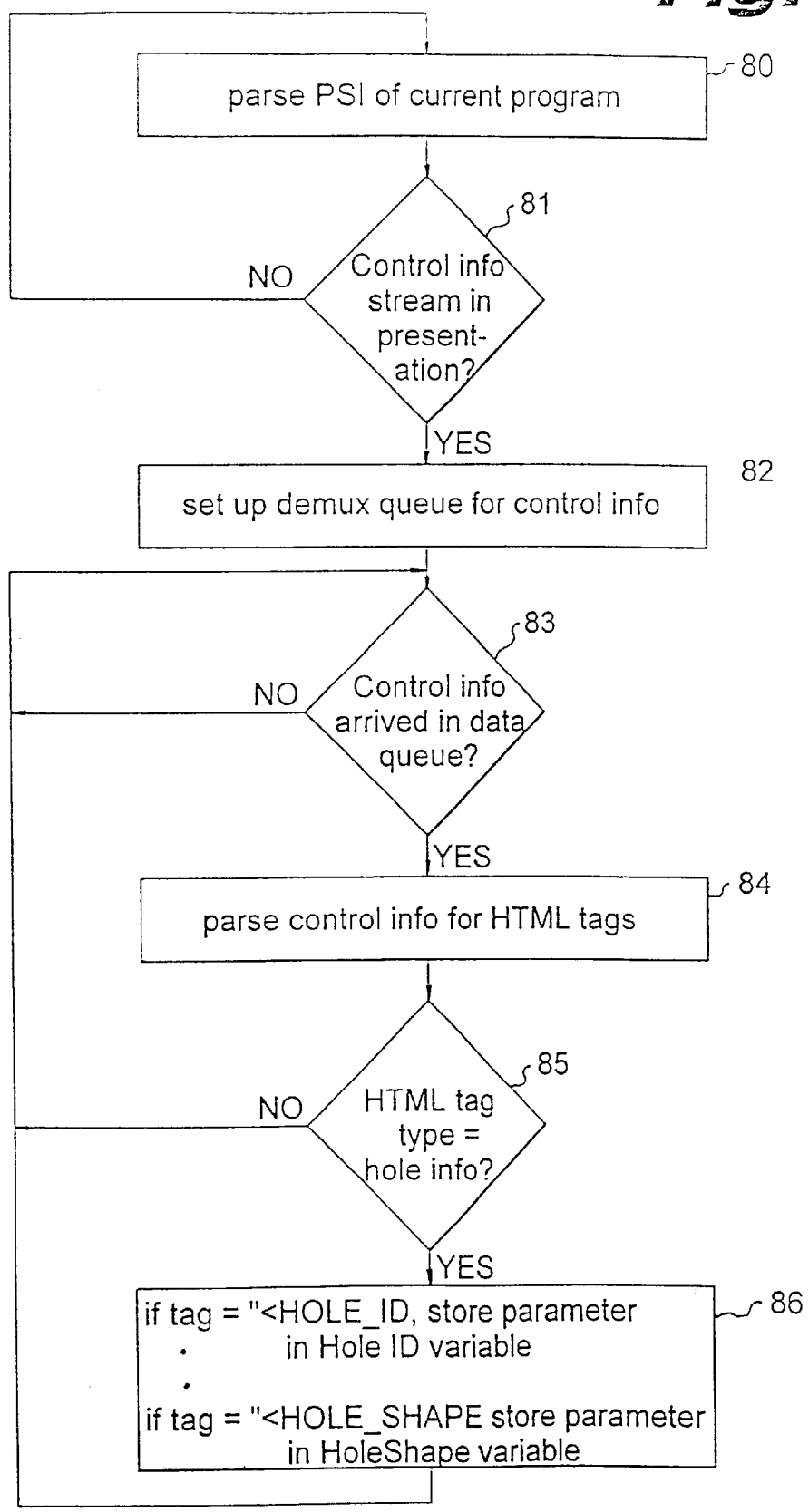
FIG. 3 is a flowchart showing steps involved in extracting and processing a "hole" information from a multimedia presentation stream.

The logical flow of the application which is loaded into the STB and used to parse control data of the video presentation stream and to display information stored in the STB in the "holes" 30 of the presentation, is shown in FIG. 3. The Program Specification Information (PSI) of the current presentation is parsed at step 80. A determination is made at step 81 whether any control information with "holes" locations will be arriving with this presentation. If the information will not be arriving, the program control returns to step 80, and the next presentation will be parsed. If the information will be arriving, then at step 82 demultiplexer queues are setup to receive it. At step 83, a determination is made whether the control data has arrived in demultiplexer queues, if not, the test at step 83 is repeated. When the information has arrived at the queues, it is parsed at step 84 to ascertain the HTML tags. At step 85 the HTML tags are matched with the "hole" information. If there is no match, the program control returns to step 83. If there is a match, step 86 assigns the received data to associated variables, and returns program control to step 83.

When all the information about "holes" and the overlay information is parsed and assembled in the STB, then it becomes a straight forward, commonly known task of the STB to overlay content at given "hole" coordinates with overlay data while displaying the presentation stream on a video monitor. A similar process applies to audio "holes."

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by Letters Patent is:

1. A method for displaying an enhanced multimedia presentation including personalized supplementary audio, video, and graphic content selectable by a user and rendered by a receiving device, the method comprising:

communicating a multimedia presentation file to said receiving device, said multimedia presentation file comprising base multimedia presentation content and, frame-synchronized information including starting frame timing identifier, ending frame timing identifier, starting frame spatial coordinates, ending frame spatial coordinates, and motion vector specifications for describing frame-accurate location, motion and timing of said personalized supplementary audio, video, and graphic content, said frame-synchronized information indicating one or more free areas of said multimedia presentation absent significant base multimedia content;

extracting said frame-synchronized information from said multimedia presentation file;

retrieving said personalized supplementary audio, video and graphic content from said receiving device;

decoding said personalized supplementary audio, video and graphic content at a time sufficiently in advance of said starting frame timing identifier; and said receiving device selecting an indicated free area and initiating display of one or more items of said personalized supplementary audio, video and graphic content at frame-accurate times between said starting frame timing identifier and ending frame timing identifier at said frame coordinates in accordance with said frame-synchronized information.

2. The method of claim 1, wherein said supplementary audio, video, and graphic content is stored in said receiving device.

3. The method of claim 2, wherein said supplementary audio, video, and graphic content is communicated with said multimedia presentation base content.

4. The method of claim 3, wherein said frame-synchronized information is determined and embedded in said multimedia presentation file in an authoring step prior to the communication step.

5. The method of claim 4 wherein said frame-synchronized information is allowed to be altered in said receiving device via a user interface.

6. The method of claim 5, wherein said frame-synchronized information further includes: an identifier for coordination with an video/audio content insertion application, a media type, and, description of a bitmap if said video is to be inserted, and volume level if audio is to be inserted.

7. The method of claim 6, wherein said frame-synchronized information is defined in such a way that displaying of said supplementary audio, video and graphic content will not interfere with viewing of said multimedia presentation base content.

8. The method of claim 7, wherein said frame-synchronized information is defined in frame-synchronized coordination with visible objects in said multimedia presentation base content.

9. The method of claim 8, wherein said frame-synchronized information is defined in such a way that supplementary audio play can be performed without interfering with the sound of said multimedia presentation base content.

10. The method of claim 9, wherein said frame-synchronized information is defined in such a way that supplementary audio content can be introduced in coordination with the audio units of said multimedia presentation base content.

11. The method of claim 10, wherein said frame-synchronized information is used in displaying said supplementary audio, video, and graphic content in such a way as not to interfere with the viewing or hearing of said multimedia presentation base content.

12. The method of claim 11, wherein said frame-synchronized information is used in displaying said supplementary audio, video, and graphic content which are coordinated with base audio, video and graphic content of said multimedia presentation, forming a hybrid of coordinated presentation from the conjunction of said base multimedia presentation content and said supplementary audio, video, and graphic content.

13. The method of claim 12, wherein personalization information is stored in said receiving device via said user interface.

14. The method of claim 13, wherein said personalization information includes: said viewer's name, said viewer's age, content restriction for said viewer, text preference, audio replacement enablement switch, video replacement enablement switch, and a pointer to a sprite associated with a viewer.

15. A computer program device readable by a machine, tangibly embodying a program of instructions executable by a machine to perform method steps for displaying an enhanced multimedia presentation including personalized supplementary audio, video, and graphic content selectable by a user and rendered by a receiving device, the method comprising:

communicating a multimedia presentation file to said receiving device, said multimedia presentation file comprising base multimedia presentation content and, frame-synchronized information including starting frame timing identifier, ending frame timing identifier, starting frame spatial coordinates, ending frame spatial coordinates, and motion vector specifications for describing frame-accurate location, motion and timing of said personalized supplementary audio, video, and graphic content, said frame-synchronized information representing free areas of said multimedia presentation absent significant base multimedia content;

extracting said frame-synchronized information from said multimedia presentation file;

retrieving said personalized supplementary audio, video and graphic content from said receiving device;

decoding said personalized supplementary audio, video and graphic content at a time sufficiently in advance of said starting frame timing identifier; and selecting an indicated free area and initiating display of one or more items of said personalized supplementary audio, video and graphic content at frame-accurate times between said starting frame timing identifier and ending frame timing identifier at said frame coordinates in accordance with said frame-synchronized information.

16. The method of claim 15, wherein said supplementary audio, video, and graphic content is stored in said receiving device.

17. The method of claim 16, wherein said supplementary audio, video, and graphic content is communicated with said multimedia presentation base content.

18. The method of claim 17, wherein said frame-synchronized information is determined in an authoring step prior to the communication step.

19. The method of claim 18, wherein said frame-synchronized information is allowed to be altered in said receiving device via a user interface.

20. The method of claim 19, wherein said frame-synchronized information further includes: an identifier for coordination with an video/audio content insertion application, a media type, and, description of a bitmap if said video is to be inserted, and volume level if audio is to be inserted.

21. The method of claim 20, wherein said frame-synchronized information is defined in such a way that displaying of said supplementary audio, video and graphic content will not interfere with viewing of said multimedia presentation base content.

22. The method of claim 21, wherein said frame-synchronized information is defined in frame-synchronized coordination with visible objects in said multimedia presentation base content.

23. The method of claim 22, wherein said frame-synchronized information is defined in such a way that supplementary audio play can be performed without interfering with the sound of said multimedia presentation base content.

24. The method of claim 23, wherein said frame-synchronized information is defined in such a way that supplementary audio content can be introduced in coordination with the audio units of said multimedia presentation base content.

25. The method of claim 24, wherein said frame-synchronized information is used in displaying said supplementary audio, video, and graphic content in such a way as not to interfere with the viewing or hearing of said, multimedia presentation base content.

26. The method of claim 25, wherein said frame-synchronized information is used in displaying said supplementary audio, video, and graphic content which are coordinated with base audio, video and graphic content of said multimedia presentation, forming a hybrid of coordinated presentation from the conjunction of said base multimedia presentation content and said supplementary audio, video, and graphic content.

27. The method of claim 26, wherein personalization information is stored in a receiving device via said user interface.

28. The method of claim 27, wherein said personalization information includes: said viewer's name, said viewer's age, content restriction for said viewer, text preference, audio replacement enablement switch, video replacement enablement switch, and a pointer to a sprite associated with a viewer.

* * * * *